United States Patent [19]
Bratt et al.

[11] 3,803,702
[45] Apr. 16, 1974

[54] METHOD OF FABRICATING A COMPOSITE STEEL ARTICLE

[75] Inventors: Richard W. Bratt, Syracuse, N.Y.; Gary Steven, Mount Lebanon Township, Allegheny County, Pa.

[73] Assignee: Crucible Inc., Pittsburgh, Pa.

[22] Filed: June 27, 1972

[21] Appl. No.: 266,765

[52] U.S. Cl.......... 29/420.5, 29/DIG. 31, 75/208 R, 75/226
[51] Int. Cl................................................ B22f 3/24
[58] Field of Search............ 29/DIG. 31, 420, 420.5, 29/191.2, 182.1; 75/208 R, 226

[56] References Cited
UNITED STATES PATENTS

| | | | |
|---|---|---|---|
| 2,938,791 | 5/1960 | Blainey | 75/226 |
| 2,992,172 | 7/1961 | Blainey et al. | 75/208 R |
| 3,109,224 | 11/1963 | Fearnside | 29/420.5 X |
| 3,279,917 | 10/1966 | Ballard et al. | 29/DIG. 31 |
| 3,678,567 | 7/1972 | Manilla et al. | 29/420.5 |
| 3,753,704 | 8/1973 | Manilla et al. | 75/208 R |

FOREIGN PATENTS OR APPLICATIONS

| | | | |
|---|---|---|---|
| 587,827 | 5/1947 | Great Britain | 29/420.5 |

*Primary Examiner*—Charles W. Lanham
*Assistant Examiner*—D. C. Reiley, III

[57] ABSTRACT

A composite alloy article and method for producing the same wherein the article, which may be cylindrical, has an alloy core surrounded by compacted alloy powder; the core is preferably relatively tougher and more machinable than the alloy powder. The composite is produced by isostatic compacting at elevated temperature. Preferred articles would be cutting tools, such as hobs and milling cutters.

9 Claims, 4 Drawing Figures

COMPACTED CORE
POWDER

METHOD OF FABRICATING A COMPOSITE STEEL ARTICLE

In many final-product applications wherein powder metallurgy techniques are used in production, it is desirable to have articles characterized by a hard, wear resistant exterior and a relatively tougher and more machinable interior. For example, it is known to produce hobs by powder metallurgy techniques. In this application a charge of high-speed steel powder is compacted at elevated temperature to form a cylinder corresponding generally to the desired size of the hob. After formation of the compacted cylinder it is necessary to drill an axial bore therethrough and also to provide a keyway within the bore, all for the purpose of accommodating the shaft of the hob. This operation is difficult because the material that must be drilled and machined is high-speed steel, which of necessity must be used in the manufacture of the hob to provide the required cutting ability and wear resistance during use. Therefore, it would be desirable to have an article that would provide the desired hardness and wear resistance where required for cutting use and yet be readily machinable to permit the required machining and drilling.

In addition there are products that are made by powder metallurgy techniques wherein teeth or other irregular cutting surfaces are provided in the extremely hard surface of the article. To prolong the life of such products, particularly by preventing breaking off of cutting teeth and the like at the root, it would be desirable if the root were of relatively tougher material than that of the remainder of the teeth.

It is accordingly a primary object of the present invention to provide a composite article, preferably for cutting applications and a method of manufacturing the same by powder metallurgy techniques, wherein compacted powder surrounds and is metallurgically bonded to a core of relatively tougher and more machinable alloy so that the compacted powder defining the exterior of the article provides the desired cutting ability and wear resistance, and the core provides the required toughness and machinability.

These and other objects of the invention as well as a complete understanding thereof may be obtained from the following description, specific examples and drawings, in which.

Figure 1:
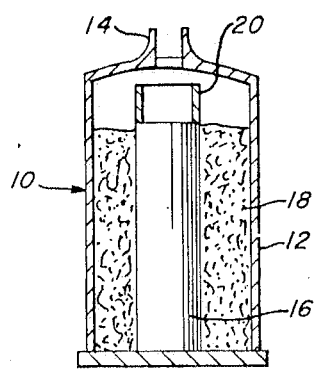
FIG. 1 is a schematic showing in vertical cross section of an assembly in accordance with the present invention for compacting in accordance with the method of the present invention to produce the composite article of the invention.

Broadly the method of the present invention is for the production of a composite alloy article consisting of an alloy core surrounded by compacted alloy powder. The article is produced by surrounding a fully dense alloy core with alloy powder to form an assembly and isostatically compacting the assembly at a temperature sufficient to compact the powder to a density greater than 95 percent of theoretical and metallurgically bond the same to the core to form a composite article. After compacting, if it is desired to further decrease a dimension of the article, it may be mechanically worked, typically at conventional hot-working temperatures on the order of 1,700° to 2,200° F. In the case of composites wherein the powder consists of a high-speed alloy such typically would be isostatically compacted while at a temperature on the order of 2,000° to 2,300° F. Compacting pressures of 10,000 to 20,000 psi could be employed. It is necessary to achieve compacting by the use of isostatic pressure so that the required high densities and metallurgical bond may be produced, while maintaining the product uniform throughout. For this purpose, various pressure vessels or autoclaves employing a fluid pressure medium, such as nitrogen or helium, may be used; although various apparatus of this type are sufficient for use in the practice of the invention, one example thereof is that shown in Boyer U.S. Pat. No. 3,543,345.

In applications such as the manufacture of hobs wherein provision must be made for an axial bore to accommodate a shaft, the alloy used for the core of the composite hob is relatively tougher and more machinable than the alloy of the powder, which must be hard and wear resistant for use in cutting. In this manner the relatively more machinable core may be drilled to provide the bore necessary to accommodate the shaft. The necessary key-ways for securing the shaft may be easily provided by conventional machining operations. The exterior constituting the compacted powder then constitutes the surface in which the cutting teeth are provided. In applications involving the manufacture of hobs, to facilitate machining the key-ways and to provide a tough ductile sleeve about the shaft, it is preferred that a concentric margin portion of the core be left surrounding the bore during the drilling operation. It is preferred for the purpose of hob manufacture that the composite comprise a low-alloy steel core and a high-speed steel in powder form compacted around and metallurgically bonded to the core.

For manufacture of this composite hob the core and powder would be placed in a container, which would typically be constructed of mild steel, to form an assembly; the container would be evacuated and sealed against the atmosphere, the assembly heated to an elevated temperature and then compacted in the autoclave while at elevated temperature. By the use of isostatic compacting and compacting temperatures on the order of 2,000° to 2,300° F, it is possible to consistently achieve densities of 95 percent and greater of theoretical, which are necessary to insure product integrity, particularly for high-speed cutting applications.

For purposes of this invention the term "low-alloy steel" is defined as a steel consisting of 0.15 to 0.70 percent carbon, plus alloying elements which might include up to 2 percent manganese, up to 0.50 percent sulfur, up to 2 percent silicon, up to 4 percent nickel, up to 6 percent chromium, up to 2 percent vanadium, up to 2 percent tungsten, up to 2 percent molybdenum, and the balance iron; it is understood that within the limits of this definition of "low-alloy steel" there may be compositions that would typically be regarded in the art as carbon steels as well as medium-alloy steels. The term "high-speed steel" is defined as a steel consisting, in weight percent, of 0.80 to 3.00 carbon, up to 2 manganese, up to 1 silicon, up to 0.5 sulfur, up to 18 tungsten, up to 10 chromium, up to 12 molybdenum, up to 5 vanadium, up to 12 cobalt and the balance iron, with tungsten + molybdenum + chromium + vanadium being equal to at least 10 percent.

For manufacture of cutting tools, which is the preferred application of the invention, the composition selected for the core material will be based on the following:

1. low cost relative to the cutting-material portion of the article;
2. readily machinable prior to hardening of the article;
3. compatible with the heat treatment required for the hardening of the cutting-material portion of the article; and
4. sufficient strength and toughness to withstand initial shock and continued torque during cutting.

To achieve a composite article wherein the powder is compacted to uniform density it is preferred in the practice of the invention to terminate the core short of the end of the container to provide a void space and fill the container with powder to a level not less than the termination of the core. Then the remaining portion, or void space, of the container is provided with a material that will maintain the powder in place prior to compacting, and particularly during outgassing, and collapse along with the container and powder during the application of isostatic pressure for compacting. In this manner the pressure exerted along the top of the assembly is equal to that exerted about the sides and such results in uniform density. The material used for this purpose may be additional powder, a thin-walled tubing in axial alignment with the core, steel wool or a combination of these materials.

In using the invention for the manufacture of hobs, the preferred final product would comprise a cylindrical composite article having an axial drilling to accommodate a shaft with the bore surrounded by a sleeve of low-alloy steel in which the required key-ways are machined; metallurgically bonded to the sleeve is compacted high-speed steel powder of a density greater than 95 percent of theoretical and into the exterior of which is formed an irregular cutting surface.

Figure 2:
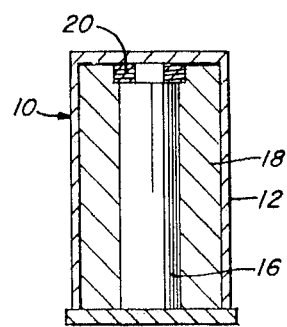
FIG. 2 is a schematic showing of the assembly of FIG. 1 after compacting.

With reference to the drawings, and for the present to FIGS. 1 and 2 thereof, there is shown, in accordance with the present invention, an assembly designated generally as 10 including a mild steel cylindrical container 12 with a stem 14 for connection to a pump (not shown) for evacuating the interior of the container incident to outgassing in accordance with conventional powder metallurgy practice. The stem 14, after outgassing has been completed, may be closed to seal the container 12 against the atmosphere prior to heating and compacting. The assembly further includes a solid cylindrical bar 16, which may be of low-alloy steel, axially positioned within the container 12 and having an upper end, as viewed in the drawings, terminating a distance from the upper end of the container 12. The container 12 is filled with alloy powder 18, which may be high-speed steel, to a level not less than the upper end of bar 16. A thin-walled tube section 20 is positioned axially with respect to bar 16 and extends from the end thereof to the top of container 12 and surrounds the stem 14. The tubing section 20 may be of any material that is readily collapsible and more specifically of a material and construction that will collapse and compact along with the container 12 and powder 18 upon application of isostatic pressure. During the pumping of the container interior incident to outgassing the tubing section 20 prevents any substantial quantity of the powder from being removed from the container or otherwise substantially disturbed.

The assembly 10, as shown in FIG. 1, is heated to a compacting temperature on the order of 2,000° to 2,300° F, customarily by placing the same in a furnace (not shown), and when heated to this temperature the assembly is placed in an autoclave (not shown) for compacting in the well-known manner by the application of fluid pressure. Generally nitrogen or helium gas is used as the pressure media. Upon compacting the top of the container 12 will collapse uniformly with the tubing section 20 to provide a true isostatic condition with respect to the assembly 10, as shown in FIG. 2, to result in a fully dense, homogeneous product.

It is understood that tubing 20 may be replaced by any material that will readily collapse along with the container 12 and thus provide for uniform pressure application and uniform compacting along the top of the assembly 10 while preventing substantial removal or disturbance of the powder prior to compacting.

Figure 3:
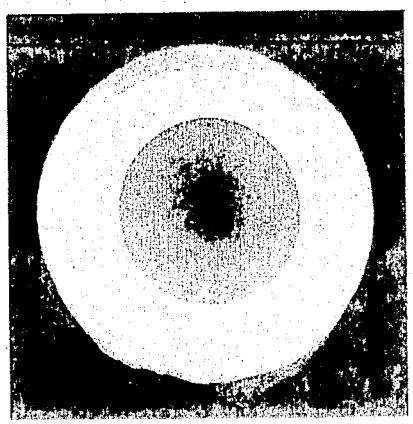
FIG. 3 is a transverse cross section through a composite article in accordance with the present invention.
Figure 4:
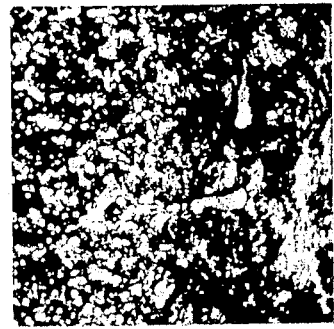
FIG. 4 is a photomicrograph (magnification 1000X) showing the metallurgical bond achieved in the article of FIG. 3.

A composite alloy article resulting from the method of the invention as described above may be seen in cross section in FIG. 3, prior to removal of the container. This FIGURE shows, in transverse cross section, a cylindrical article consisting of a cylindrical bar as an axial core with alloy powder compacted therearound to substantially 100 percent density; the aritcle is surrounded by the container, which is removed as by a machining operation. The compacted powder, as may be seen in FIG. 4, is metallurgically bonded to the core by the combination of high temperature and isostatic pressure.

If the composite article is to be used in the manufacture of a hob an axial drilling would be made through the article at the core. Customarily a margin or sleeve of the core material would be left around the bore during the drilling operation to provide for machining of necessary key-ways and also to provide a tough, crack-resistant bushing that would provide the desired crack resistance under the torque resulting from rotation of the shaft during cutting applications.

Alternately after compacting if it is desired to reduce further the dimension of the composite article such may be reheated to a satisfactory hot-working temperature and the article may be hot worked in the well-known conventional manner.

As a specific example of the practice of the invention two compacts in accordance with the present invention were produced using the alloys listed in Table I:

TABLE I

| Alloy | Composition (wt %) | | | | | | | | |
|---|---|---|---|---|---|---|---|---|---|
| | C | Mn | Si | Cr | V | W | Mo | S | Fe |
| REX M7 | 1.00 | 0.30 | 0.30 | 3.75 | 2.00 | 1.75 | 8.75 | 0.025 max. | Bal. |
| REX M2S HC | 1.00 | .30 | .30 | 4.15 | 1.95 | 6.40 | 5.00 | .15 | Bal. |
| CSM 2 | 0.30 | .80 | .50 | 1.65 | | | 0.48 | .025 max. | Bal. |
| MAXEL 3½ | .50 | 1.25 | | 0.65 | | | .18 | .08 | Bal. |

EXAMPLE I

A cylindrical mild steel container 48 in. long and having an outside diameter of 10¾ in. and an inside diameter of 9¼ in. was provided with an axial, cylindrical core of the CSM 2 composition set forth in Table I; the core constituted a rod 42 in. long with a 3¾ in. diameter. The container was then filled with powder of the REX M7 composition listed in Table I to a height in the container substantially corresponding to the end of the rod. The void remaining in the upper end of the container above the end of the rod and the powder level was filled with steel wool. The container was outgassed to remove any moisture therein, sealed against the atmosphere and then transferred to a furnace wherein it was heated to a temperature of about 2,200° F. It was then transferred to an autoclave where it was compacted to a density approaching 100 percent of theoretical by the use of nitrogen gas as the pressure medium with a compacting pressure of about 13,000 psi. Examination of the as-compacted product indicated that it was fully dense, e.g., a density approaching 100 percent of theoretical density and homogeneous throughout. Also, a uniform metallurgical bond existed between the compacted powder and the core. The as-compacted product was successfully forged to a 5 in. billet and rolled into 2 in. bar stock; upon examination it was found that the metallurgical bond remained intact during the forging and rolling operations. The as-compacted material was capable of heat treatment to achieve a hardness of about 65 $R_c$ for the REX M7 material and 37 $R_c$ with respect to the CSM 2 material.

EXAMPLE II

An additional trial was conducted similar to that reported above with respect to Example I except that the core was the MAXEL 3½ composition reported in Table I and the powder was the REX M2S HC composition reported in Table I; the response to heat treatment of the as-compacted product was 66 $R_c$ for the REX M2S HC material and 25 $R_c$ for the MAXEL 3½ material.

We claim:

1. A method for producing a composite alloy article comprising a low alloy steel core surrounded by compacted high speed steel powder, said method comprising surrounding a low alloy steel core with high speed steel powder to form an assembly, hot isostatically compacting said assembly at a temperature and pressure sufficient to compact said powder to a density greater than 95 percent of theoretical and metallurgically bond the same to said core, said pressure being at least 10,000 psi and said temperature being at least 2,000°F, and upon completion of said compacting removing at least a portion of said core.

2. The method of claim 1 wherein said alloy core is fully dense prior to said compacting.

3. The method of claim 2 wherein said assembly is mechanically worked after said compacting.

4. The method of claim 2 wherein said assembly after compacting is substantially cylindrical and said core extends axially therein.

5. The method of claim 4 wherein an axial drilling is made through said assembly at said core.

6. The method of claim 2 wherein said core and said powder are placed in a container for heating and compacting and subsequently removing said container from the compacted composite article.

7. A method for producing a composite alloy article comprising a low-alloy steel core surrounded by compacted high-speed steel powder, said method comprising producing an assembly by placing a low-alloy steel core axially within a container and placing high-speed steel powder in said container so that said powder surrounds said core, then sealing said container, isostatically compacting said assembly at a temperature and pressure sufficient to compact said powder to a density greater than 95 percent of theoretical and metallurgically bond the same to said core, said pressure being within the range of 10,000 to 20,000 psi and said temperature being within the range of 1,700° to 2,200°F, and upon completion of said compacting removing said container and at least a portion of said core.

8. The method of claim 7 wherein said compacted assembly is drilled to provide an axial bore through said assembly at said core.

9. The method of claim 8 wherein said assembly is cylindrical.

* * * * *